Patented June 30, 1931

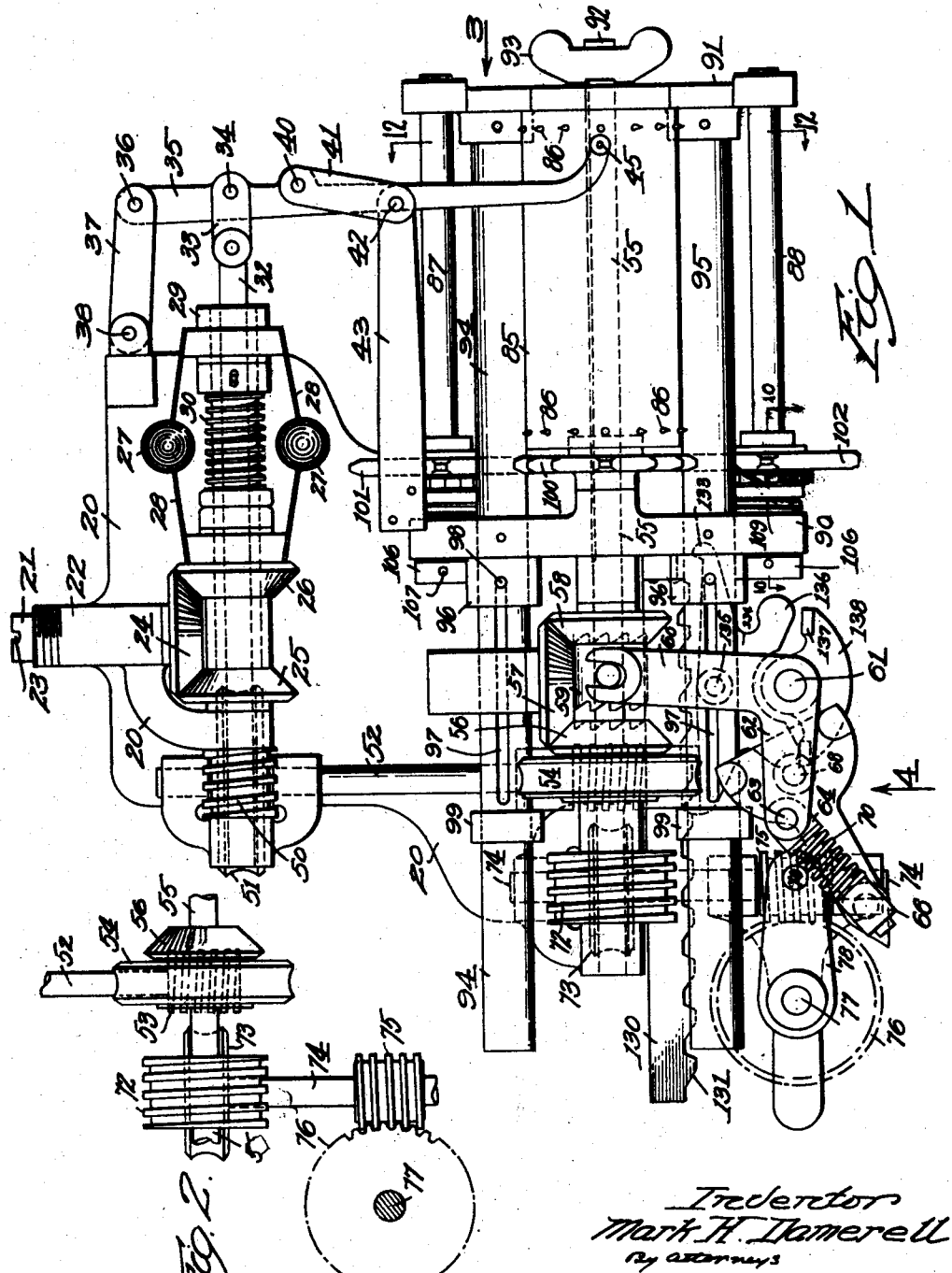

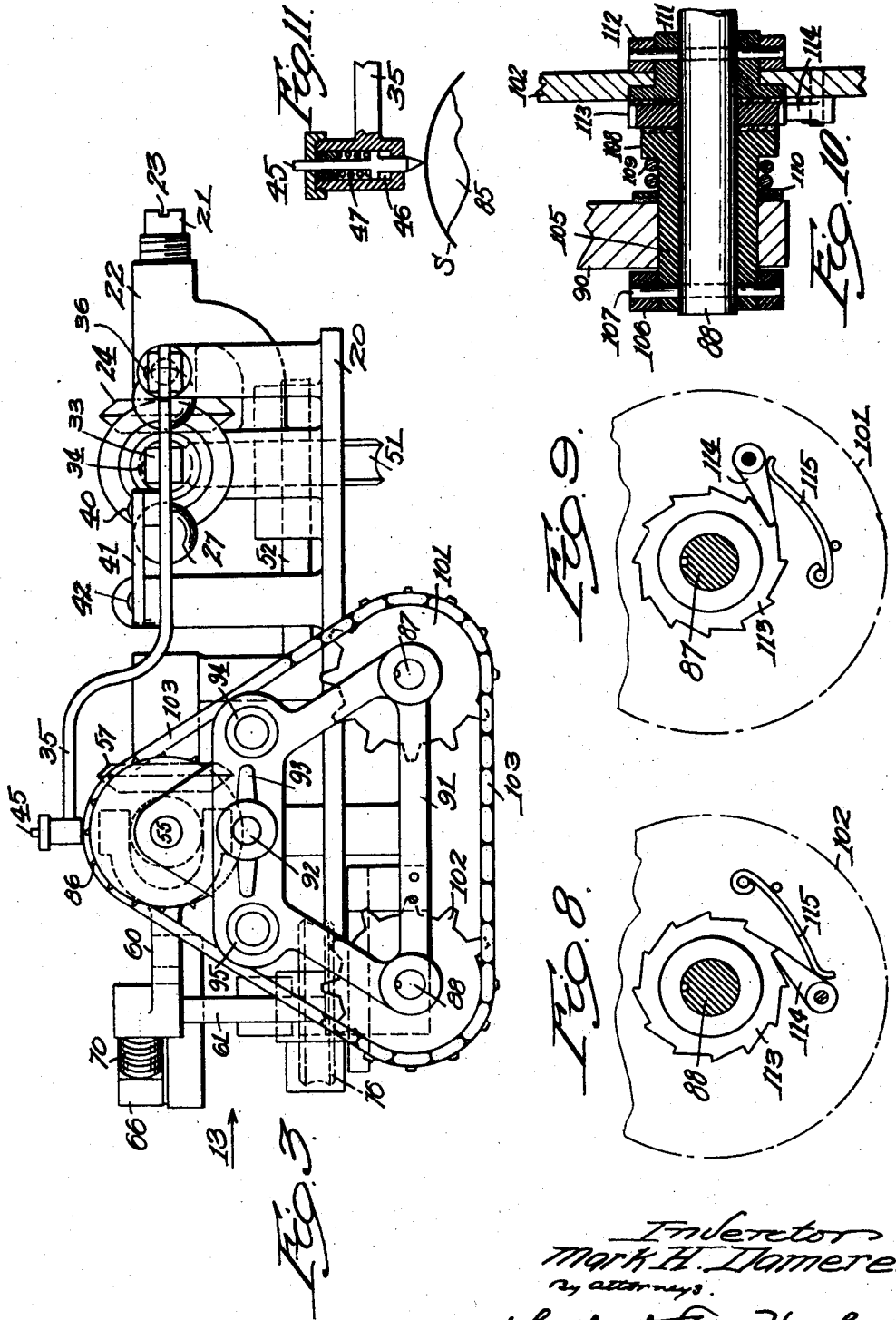

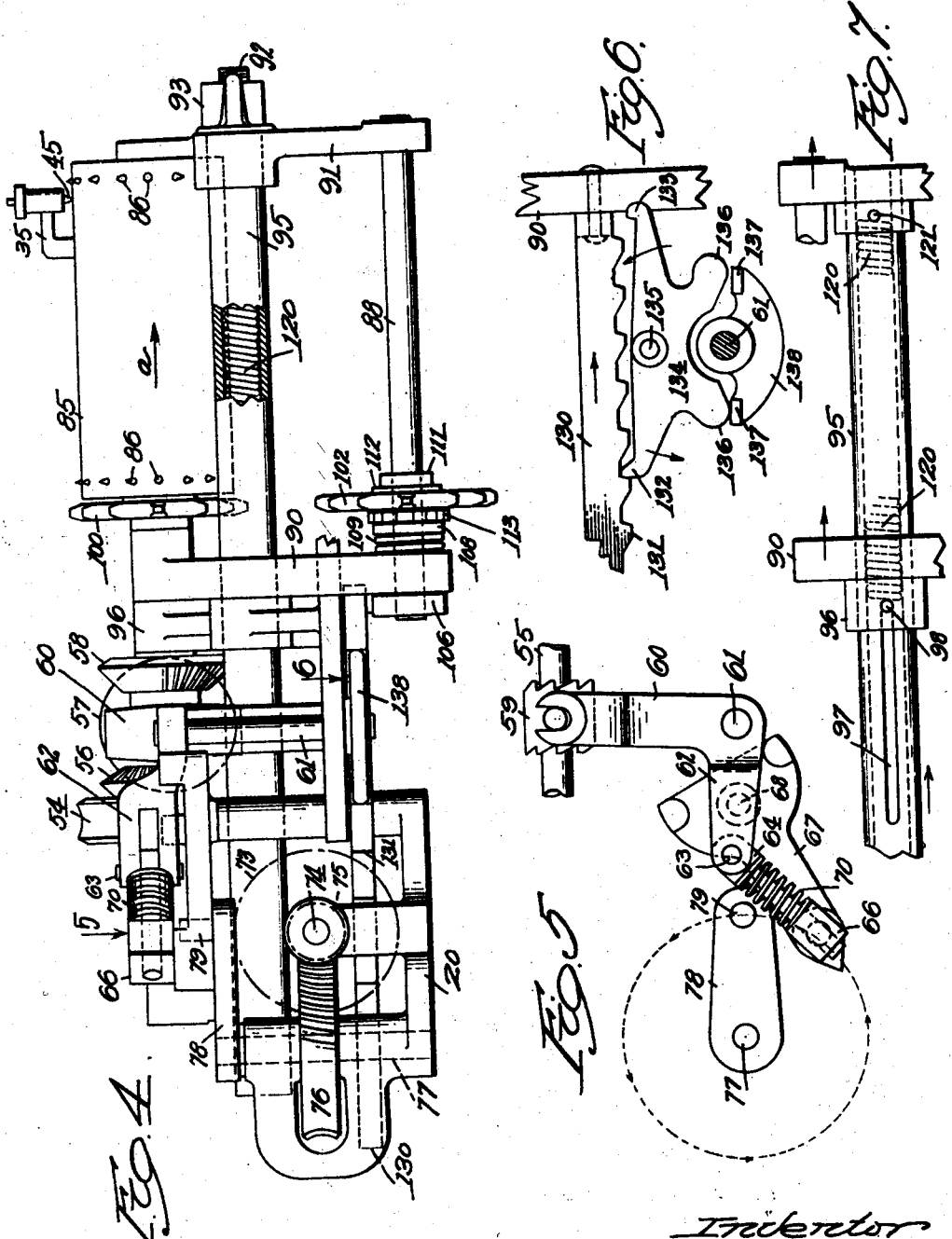

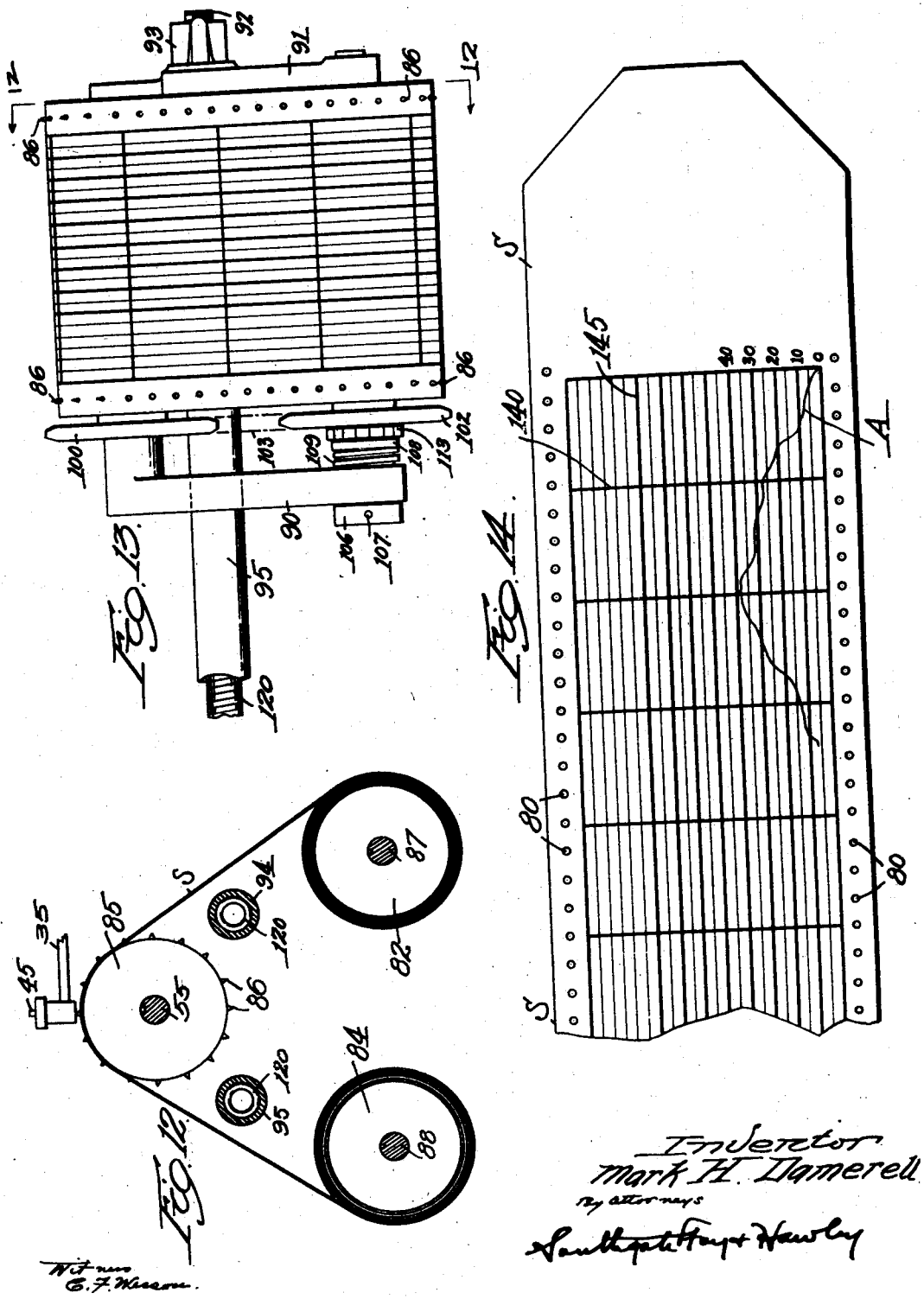

1,812,083

UNITED STATES PATENT OFFICE

MARK H. DAMERELL, OF WORCESTER, MASSACHUSETTS

SPEED RECORDING MECHANISM

Application filed January 6, 1928. Serial No. 244,986.

This invention relates to an instrument capable of general application, but particularly designed for recording the speed of an automobile or other vehicle and preserving the same in permanent form.

It is frequently desirable for many purposes to be able to show the speed at which a vehicle was moving at a given time and place. It is also desirable to be able to show the speed variation from time to time, and the distances covered at different speeds. Such data are valuable in testing engine performance, fuel economy, or operator's efficiency, and is particularly desired in determining speed variations immediately preceding accidents.

It is the general object of my invention to provide a mechanism by which a progressive record of speed variations in respect to distances may be effectively produced. A further object is to provide such a mechanism, in which the permanent record is greatly condensed, so that the record of conditions for hundreds of driving miles may be made in a relatively small compass.

With these objects in view, improved features of my invention relate to the provision of improved mechanism for feeding a record sheet through a machine, for automatically reversing the record sheet, and for simultaneously causing a lateral shift between the record sheet and the recording element, so that successive records may be made on the same sheet, each of which will remain clearly legible.

My invention further relates to arrangements and combinations of parts which will be hereinafter described and more particularly pointed out in the appended claims.

A preferred form of the invention is shown in the drawings, in which

Fig. 1 is a plan view of my improved recording mechanism;

Fig. 2 is a partial plan view of certain driving connections;

Fig. 3 is an end elevation of the mechanism, looking in the direction of the arrow 3 in Fig. 1;

Fig. 4 is a front elevation of the mechanism, looking in the direction of the arrow 4 in Fig. 1;

Figs. 5 and 6 are detail plan views, looking in the directions of the arrows 5 and 6 of Fig. 4;

Fig. 7 is a detail view of parts of the sliding support for the record holder;

Figs. 8 and 9 are enlarged end elevations of certain driving connections;

Fig. 10 is a detail sectional view, taken along the line 10—10 in Fig. 1;

Fig. 11 is a detail sectional view of the recording element;

Fig. 12 is a sectional elevation, taken along the line 12—12 in Figs. 1 and 13;

Fig. 13 is a side elevation of the record holder, looking in the direction of the arrow 13 in Fig. 3, and Fig. 14 is a plan view of a portion of a record sheet.

Referring to the drawings, my improved recording mechanism comprises a frame member 20 (Figs. 1 and 3) which may be secured in any convenient place in an automobile or other vehicle. A driving shaft 21 (Fig. 1) is mounted in a bearing 22 in the frame 20. The shaft 21 may have a notch 23 to receive the corresponding end of any suitable drive shaft (not shown), which is rotated in accordance with the rate of movement of the vehicle, as is the drive shaft of an ordinary speedometer.

Speed indicating mechanism

A bevel gear 24 is mounted on the shaft 21 and engages a pair of bevel gears 25 and 26. The gear 26 rotates a pair of centrifugal governor balls 27, mounted on resilient members 28 and connected at one end to the hub of the gear 26 and at the opposite end to a sliding collar 29. A coil spring 30 resists the sliding movement of the collar in one direction, and thus tends to restrain outward movement of the balls 27.

The collar 29 has an extension 32 connected by links 33 to a stud 34 in a recording lever 35. The upper end of the lever 35 is pivoted at 36 to a link 37, which in turn is pivoted at 38 to the frame 20. The lever 35 is also pivoted at 40 to links 41, which are themselves pivoted at 42 to arms 43 secured to the frame 20.

A recording element 45 (Fig. 11) is mounted in the outer end of the lever 35 and may be of any desired construction. As shown herein, the element 45 is made in the form of a plunger slidable in a recess 46 in the end of the lever 35 and yieldingly pressed downward by a coil spring 47. Such a plunger may be of metal and it may be used in connection with a sensitized record sheet, but my invention is not limited to the use of any particular form of recording element.

The linkage above described, by which the lever 35 is supported, is so designed that the element 45 will have a substantially straight line movement across the recording sheet, such movement corresponding proportionately to the movements of the centrifugal governor. The recording element 45 will thus be moved from normal or zero position toward the left in Fig. 1 a distance corresponding to the speed of rotation of the drive shaft 21, which in turn corresponds to the rate of travel of the vehicle.

Record sheet driving mechanism

The second bevel gear 25 is mounted on a short shaft having suitable bearings in the frame 20, and is provided with a worm 50 (Fig. 1) driving a worm wheel 51 on a cross shaft 52. The shaft 52 carries a worm 53 (Fig. 2) driving a second worm wheel 54 loose on a shaft 55. A bevel gear 56 is fast to the worm-wheel 54 and engages an idle bevel gear 57 (Fig. 1) which in turn drives a third bevel gear 58 also loose on the shaft 55.

A clutch collar 59 is slidable, but non-rotatable, on the shaft 55, and is provided with clutch teeth adapted to engage notched recesses in the adjacent faces of the bevel gears 56 and 58. The clutch collar 59 may be caused to engage either of the bevel gears by means of a shifting lever 60 mounted on a fixed pivot 61 and having an offset arm 62 pivotally connected at 63 to a toggle member 64 (Fig. 5), which is slidable in a swivel stud 66 mounted in the outwardly extending arm of a supporting member 67, pivoted at 68.

A compression spring 70 is introduced between the head of the member 64 and the swivel stud 66, which spring is compressed as the toggle is straightened and thereafter expands with a snap action to hold the toggle in one of its extreme positions, with the clutch collar 59 in driving relation to one of the bevel gears 56 or 58.

Clutch reversing mechanism

I have provided special mechanism for automatically shifting the toggle and reversing the clutch connection after a predetermined travel of the record sheet in each direction. For this purpose the shaft 55 (Fig. 2) is provided with a worm 72 meshing with a worm wheel 73 on a short shaft 74, which in turn is provided with a worm 75 engaging a worm wheel 76 fixed on a shaft 77 (Fig. 4). An arm 78 is fixed to the upper end of the shaft 77 and is provided with a stud 79 (Figs. 1 and 5) adapted to engage the pivoted member 67 which supports the toggle link.

The arm 78 and stud 79 are moved at greatly reduced speed by the successive worm and worm gear connections, so that the arm and stud make substantially one revolution while the record sheet is being drawn beneath the recording element from end to end. As the sheet approaches its limit of travel in either direction, the stud 79 engages the member 67 on one side or the other and moves the same in such a way as to reverse the toggle and thus reverse the clutch connection to the bevel gears 56 and 58 (Fig. 1).

Record carriage

The record sheet S (Fig. 14) is provided with a series of perforations 80 along each edge thereof and is ruled longitudinally to indicate speed and is also ruled transversely to indicate distance, as will be hereinafter described.

The sheet S is wound on rollers 82 and 84 and passes over a roll 85 having pins or studs 86 (Fig. 1) projecting therefrom. The roll 85 is keyed to the shaft 55 to which the clutch collar 59 is also keyed and will thus be rotated in one direction or the other in accordance with the position of the clutch collar 59.

The winding rolls 82 and 84 are mounted on winding shafts 87 and 88 (Fig. 1), suitably supported in bearings in carriage frame members 90 and 91, which are secured in assembled relation by a tie rod 92 (Figs. 3 and 4) and a binding nut 93. The carriage frame members 90 and 91 are also secured to supporting rods 94 and 95 slidable in fixed bearings 96 (Fig. 1) and provided with slots 97 through which extend pins or studs 98. Collars 99 limit the sliding movement.

The record sheet and its supporting carriage is thus mounted for movement transversely of the sheet and relatively to the driving mechanism, but the keyed connection of the roll 85 to the shaft 55 permits the roll 85 to be rotated at the desired speed in any transverse position thereof.

Winding mechanism

The shaft 55 is provided with a sprocket 100 (Fig. 4) and sprockets 101 and 102 are provided for the winding rolls 82 and 84. A sprocket chain 103 (Fig. 3) causes the three sprockets to rotate in unison. A yielding driving connection is provided between each sprocket 101 or 102 and its supporting shaft 87 or 88.

The details of one of the yielding connections are best shown in Fig. 10. The winding shaft 88 extends through a bushing 105 mounted in the carriage frame member 90 and retained therein by a collar 106 and pin or stud 107. The bushing is provided with an enlarged head 108, and a coil spring 109 is interposed between the head 108 of the bushing and friction washers 110 adjacent the frame member 90.

The sprocket 102 is freely rotatable on a hub 111 pinned to the shaft 88, and having a collar 112 to prevent displacement of the sprocket. A ratchet wheel 113 is loose on the shaft 88 and is separated by friction washers from the hub 111 and bushing head 108, the washers being forced firmly against the ratchet wheel by the spring 109. A pawl 114 is mounted on the sprocket wheel 102 and is yieldingly forced against the ratchet teeth by a spring 115. The sprocket wheel 101 (Fig. 9) is similarly mounted on the shaft 87 and is provided with a pawl 114 engaging a ratchet wheel thereon.

Reference to Figs. 8 and 9 will indicate that the ratchet wheels and pawls are reversely arranged on the two winding shafts 87 and 88.

With this construction, it will be seen that each sprocket wheel 101 or 102 is positively connected through its pawl 114 to its ratchet wheel 113 when the sprocket wheel is rotating in one direction, but if the direction of rotation is reversed, the sprocket wheel rotates freely relative to its ratchet wheel. Furthermore, each ratchet wheel frictionally engages the hub 111, fixed to the shaft 88, and the bushing 105 fixed to the frame 90.

The winding roll 82 or 84 on which the record sheet is being wound is thus frictionally driven with the roll 85, while the roll from which the sheet is being unwound is held frictionally but may yieldingly rotate as rapidly as the decreasing diameter of the unwinding roll demands. When the direction of sheet travel is reversed, the driving conditions for the winding rolls will be also reversed, and in each case the winding roll is yieldingly driven and the unwinding roll is yieldingly retarded. The rolls 82, 84 and 85 are preferably of the same size, so that the winding roll may always take up the record sheet as fast as it is delivered from the driving roll 85.

Record sheet carriage feed

Heavy coil springs 120 (Figs. 4 and 7) are inserted in the tubular carriage supporting rods 94 and 95 and are compressed between a cross pin 121 (Fig. 7) in each of the rods 94 and 95, and a cross pin 98 extending through the slot 97 in each member 94 and 95, said pins 98 being fixed in the stationary frame member 96, as previously described. The springs 120 thus act to yieldingly force the sheet carriage in the direction of the arrow a in Fig. 4.

A rack bar 130 (Fig. 6) is secured to the carriage frame member 90 and projects outwardly therefrom. The rack bar 130 is provided with teeth 131 adapted to be engaged by teeth 132 and 133 formed at the opposite ends of a rocking let-off member 134. The member 134 is mounted on a fixed pivot 135 and is provided with lugs or projections 136 adapted to be engaged by corresponding projections 137 formed on an actuating member 138, secured to the pivot shaft or stud 61 of the bell crank 60 (Fig. 1) previously described. The rack bar 130 and the let-off 134 thus provide an escapement, controlling movement of the carriage.

As has been stated, the bell crank 60 is maintained in either one of its two positions by the toggle spring 70 and snaps quickly from one extreme position to the other. Such movement will cause the teeth 132 and 133 of the rocking member 134 to alternately engage the teeth 131 of the rack bar 130, and the teeth 132 and 133 are so positioned that the rack bar will be moved by the springs 120 a distance equal to one half of a tooth space at each reversal of the let-off member 134.

The record sheet carriage is thus moved outward or to the right in Fig. 1 a distance equal to one half of the pitch of the rack bar 130, each time that the record sheet is reversed at its limit of travel in either direction, and this intermittent transverse feed will continue until the collars 99 (Fig. 1) engage the fixed frame members 96.

Operation of the recorder

Having described the details of construction of my improved recorder, the method of operation thereof is as follows:—

The record sheet is suitably attached to the winding rolls 82 and 84 and is carefully wound upon one of these rolls. The drive shaft 21 is assumed to be suitably connected to the wheels or driving mechanism of the automobile or other vehicle of which the speed is to be recorded. As the vehicle starts to move, the record sheet will begin a slow travel under the recording element 45 and the recording element will move to the left in Fig. 1 in accordance with the rate of travel of the vehicle.

A record line as A in Fig. 14 will thus be drawn on the sheet S, indicating by reference to the transverse lines 140 the distance travelled, and indicating by reference to the longitudinal lines 145 the rate of travel at any given point. This record will continue for the full length of the record sheet, which may correspond to a travel of one hundred miles or more, according to the length of the sheet.

As the sheet approaches its limit of travel, the toggle mechanism will be actuated to quickly reverse the travel, and at the same time the let off member 134 will cause the sheet to shift transversely a distance equal to one half the tooth space of the rack 130, this space corresponding to the distance between the heavy lines 145 on the record sheet S.

The record is then continued with the sheet moving in the opposite direction and with the zero line shifted transversely of the record sheet, by a distance which usually corresponds to ten miles per hour. In this way successive records may be drawn on the sheet without overlapping in such a manner as to confuse the record, and the record sheet may be used throughout its length as many as ten times before replacement of the sheet is required. Each record sheet may thus represent a car travel of a thousand miles or more and will accurately record the rate of travel for each mile of the entire distance or for any small fraction thereof.

The variations in the position of the line A from mile to mile indicate to a considerable extent the skill and efficiency of the operator and are particularly valuable in gauging the ability of commercial operators. The sheet also gives an accurate record of the speed at any given time, preserving very valuable evidence in case of accident. The instrument is also of great service in determining the most efficient speed conditions for economical operation of motor vehicles.

Having thus described my invention and the advantages thereof, I do not wish to be limited to the details herein disclosed, otherwise than as set forth in the claims, but what I claim is:—

1. The combination with a recording mechanism having a record sheet, a recording element, means to cause said record sheet to travel longitudinally relative to said recording element, and means to reverse the direction of travel, of means to shift said sheet transversely relatively to said recording element at each reversal of travel of said sheet.

2. The combination with a recording mechanism having a record sheet, a recording element, means to cause said record sheet to travel longitudinally relative to said recording element, and automatic means to reverse the direction of travel of said sheet at a predetermined point in the travel, of intermittently actuated means to shift said sheet transversely to successive new positions when reversed by said automatic means.

3. The combination with a recording mechanism having a recording element, a record sheet, winding rolls for said sheet, means to rotate said rolls, and means to reverse the direction of rotation of said rolls at a predetermined point in the travel, of intermittently actuated means to shift said rolls axially relative to said recording element upon reversal of rotation of said rolls.

4. The combination with a recording mechanism having a recording element, a record sheet, winding rolls for said sheet, a ratchet wheel frictionally mounted on each winding roll, a sprocket loosely mounted thereon, and a pawl on said sprocket effectively engaging said ratchet wheel when said sprocket rotates in one direction but freely movable relative to said wheel when rotating in the opposite direction, of means to shift the record sheet intermittently in a transverse direction, thereby to provide different loci for successive records on the sheet.

5. Recording mechanism comprising a recording element, a record sheet, winding rolls for said sheet, a carriage for said winding rolls, slidable supports for said carriage, springs to move said carriage on said supports transversely of the record sheet, and a let-off mechanism intermittently actuated and controlling said sliding movement of said carriage.

6. Recording mechanism comprising a recording element, a record sheet, winding rolls for said sheet, a carriage for said winding rolls, slidable supports for said carriage, springs to move said carriage on said supports transversely of the record sheet, and a let-off mechanism intermittently actuated and controlling said sliding movement of said carriage, said let-off mechanism being rendered operative at each reversal of travel of said record sheet.

7. The combination with a recording mechanism, a record sheet, a recording element engageable thereby, a driving roll for said sheet, and a pair of winding rolls therefor, said driving roll being positively driven and each winding roll being frictionally driven in one direction and frictionally retarded in the opposite direction, whereby a tension is placed on the sheet at all times, of means to shift the record sheet transversely at predetermined intervals in either direction of movement.

8. The combination with a recording mechanism having a record sheet, a recording element, and means to cause said record sheet to travel longitudinally relative to said recording element, of automatic means to simultaneously reverse the direction of travel of said sheet at a predetermined point in the travel, and shift said sheet transversely to a new position.

9. The combination with a recording mechanism having a recording element, a record sheet, winding rolls for said sheet and means to rotate said rolls, of means to simultaneously reverse the direction of rotation of said rolls at a predetermined point in the travel, and shift said rolls axially relative to said recording element.

10. The combination with recording mechanism, having a record sheet, a recording element, means to cause the record sheet to travel longitudinally relative to said recording element, and means to reverse the direction of travel, of intermittently actuated means to shift said sheet transversely relatively to said recording element at each reversal of travel of said sheet.

11. Recording mechanism comprising a recording element, a record sheet and a carriage mounting said record sheet, means providing a relative movement between said sheet and said recording element, thereby to produce a record on the sheet and escapement mechanism comprising a rack bar attached to the carriage and intermittently actuated pawls engageable with said rack bar whereby to produce an intermittent transverse movement of said carriage to vary the loci of successive records.

12. Recording mechanism comprising a recording element, a record sheet and a carriage mounting said record sheet, means providing a relative movement between said sheet and said recording element thereby to produce a record on the sheet, and means to move said carriage transversely of the recording element, and escapement mechanism comprising a rack bar attached to the carriage and intermittently actuated pawls engageable with said rack bar whereby to produce an intermittent transverse movement of said carriage to vary the loci of successive records.

In testimony whereof I have hereunto affixed my signature.

MARK H. DAMERELL.